US008682272B2

(12) United States Patent  
Luschi et al.

(10) Patent No.: US 8,682,272 B2  
(45) Date of Patent: Mar. 25, 2014

(54) PROCESSING SIGNALS IN A WIRELESS COMMUNICATIONS ENVIRONMENT

(75) Inventors: Carlo Luschi, Oxford (GB); Steve Allpress, Bristol (GB)

(73) Assignee: ICERA, Inc., Wilmington (DE)

( * ) Notice: Subject to any disclaimer, the term of this patent is extended or adjusted under 35 U.S.C. 154(b) by 1061 days.

(21) Appl. No.: 12/016,681

(22) Filed: Jan. 18, 2008

(65) Prior Publication Data

US 2009/0111413 A1    Apr. 30, 2009

(30) Foreign Application Priority Data

Oct. 31, 2007   (GB) .................................. 0721429.9

(51) Int. Cl.
*H04B 1/06*          (2006.01)
(52) U.S. Cl.
USPC ...... 455/231; 455/230; 455/232.1; 455/226.3
(58) Field of Classification Search
USPC ............. 455/230, 232.1, 233.1, 234.1, 234.2, 455/245.1, 246.1, 250.1, 256
See application file for complete search history.

(56) References Cited

U.S. PATENT DOCUMENTS

| | | | | |
|---|---|---|---|---|
| 6,731,618 | B1 * | 5/2004 | Chung et al. ................... | 370/328 |
| 6,973,098 | B1 * | 12/2005 | Lundby et al. ................ | 370/491 |
| 6,983,153 | B2 * | 1/2006 | Jain et al. ....................... | 455/453 |
| 6,990,087 | B2 | 1/2006 | Rao et al. | |
| 7,012,883 | B2 | 3/2006 | Jalali et al. | |
| 7,020,073 | B2 * | 3/2006 | Kadous et al. ................ | 370/208 |
| 7,212,542 | B2 * | 5/2007 | Khawand ....................... | 370/464 |
| 7,289,972 | B2 | 10/2007 | Rieser et al. | |
| 7,428,421 | B2 * | 9/2008 | Jain et al. ....................... | 455/515 |
| 7,570,690 | B2 * | 8/2009 | Pietraski et al. ............... | 375/229 |
| 7,796,568 | B2 * | 9/2010 | Tynderfeldt et al. .......... | 370/337 |
| 2002/0183013 | A1 | 12/2002 | Auckland et al. | |

(Continued)

FOREIGN PATENT DOCUMENTS

| | | |
|---|---|---|
| CN | 1296684 A | 5/2001 |
| CN | 1615623 A | 5/2005 |

(Continued)

OTHER PUBLICATIONS

Klein, A., *Data detection algorithms specially designed for the downlink of CDMA mobile radio systems*, IEEE Vehicular Technology Conference, Vo. 1, May 1997, pp. 203-207.

(Continued)

*Primary Examiner* — Lewis West  
*Assistant Examiner* — Richard Chan

(57) ABSTRACT

Methods are described of processing a signal transmitted over a channel in a wireless communication system. A method includes estimating at intervals at least one parameter of a time varying communication environment of said system. At least one processor-related signal processing criterion can be monitored for implementing a signal processing activity. Based on said at least one parameter and said at least one processor-related criterion, a signal processing function can be selected from a plurality of signal processing functions implementable by a processor. Each signal processing function includes a plurality of code blocks having a sequence of instructions for execution on a processor platform, the processor platform including a set of configurable operators having a plurality of predetermined configurations, each sequence of instructions including at least one configuration instruction, which selects one of the plurality of predefined configurations for executing that code block. Related receivers and software implementations are described.

13 Claims, 7 Drawing Sheets

(56) References Cited

U.S. PATENT DOCUMENTS

| | | | |
|---|---|---|---|
| 2004/0249915 | A1 | 12/2004 | Russell |
| 2004/0259514 | A1* | 12/2004 | Nissila ................. 455/226.1 |
| 2006/0009209 | A1 | 1/2006 | Rieser et al. |
| 2006/0109931 | A1 | 5/2006 | Asai et al. |
| 2006/0171451 | A1* | 8/2006 | Pietraski et al. ......... 375/232 |
| 2007/0092018 | A1* | 4/2007 | Fonseka et al. ......... 375/265 |
| 2007/0211786 | A1 | 9/2007 | Shattil |
| 2009/0113429 | A1* | 4/2009 | Luschi et al. ............ 718/100 |

FOREIGN PATENT DOCUMENTS

| | | |
|---|---|---|
| CN | 1650583 A | 8/2005 |
| CN | 1829102 A | 9/2006 |
| EP | 1655872 A1 | 10/2006 |
| JP | 2003-529947 A | 10/2003 |
| WO | 99/37099 A2 | 7/1999 |
| WO | 99/37099 A3 | 7/1999 |
| WO | 9937099 A2 | 7/1999 |
| WO | 9941871 A1 | 8/1999 |
| WO | 03092231 A1 | 11/2003 |
| WO | WO2006/117562 | 11/2006 |
| WO | 2007107805 A1 | 9/2007 |

OTHER PUBLICATIONS

Sampath, A., et al, *Estimation of maximum Doppler frequency for handoff decisions*, IEEE Vehicular Technology Conference, May 1993, pp. 859-862.

Tepedelenlioglu, A., et al., *Estimation of Doppler spread and signal strength in mobile communications with applications to handoff and adaptive transmission*, Wireless Communications and Mobile Computing, vol. 1, No. 2, Mar. 2001, pp. 221-242.

Luschi, C., et al., *Adaptive channel memory truncation for TDMA Digital Mobile Radio*, IEEE International Workshop on Intelligent Signal Processing and Communication Systems, Nov. 1998, pp. 665-669.

Arslan, H., et al., *Delay spread estimation for wireless communication systems*, IEEE International Symposium on Computers and Communication, Jun.-Jul. 2003, pp. 282-287.

Bistritz, Y., *Zero location with respect to the unit circle of discrete-time linear system polynomials*, Proceedings of the IEEE, vol. 72, No. 9, Sep. 1984, pp. 1131-1142.

Turkboylari, et al., *An efficient algorithm for estimating the signal-to-interference ratio in TDMA cellular systems*, IEEE Transaction on Communications, vol. 46, No. 6, Jun. 1998, pp. 728-731.

Lucky, R.W., et al., *Automatic equalization for digital communication*, Proceedings of the IEEE, pp. 96-99, 1965.

Proakis, et al., *An adaptive receiver for digital signaling through channels with intersymbol interference*, IEEE Transactions on Information Theory, vol. 15, No. 4, Jul. 1969, pp. 484-497.

Qureshi, S., *Adaptive equalization*, Proceedings of the IEEE, vol. 73, No. 9, Sep. 1985, pp. 1349-1387.

Salz, J., *Optimum mean-square decision feedback equalization*, The Bell System Technical Journal, vol. 52, No. 8, Oct. 1973, pp. 1341-1373.

Belfiore, et al., *Decision feedback equalization*, Proceedings of the IEEE, vol. 67, No. 8, Aug. 1979.

Forney, G., *Maximum-likelihood sequence estimation of digital sequences in the presence of intersymbol interference*, IEEE Transactions on Information Theory, vol. 18, No. 3, May 1972, pp. 363-378.

Bahl, L.R., et al., *Optimal decoding of linear codes for minimizing symbol error rate*, IEEE Transactions on Information Theroy, vol. 20, Mar. 1974, pp. 284-287.

Treichler, et al., *Fractionally spaced equalizers*, IEEE Signal Processing Magazine, vol. 13, No. 3, pp. 65-81.

Luschi, C., et al., *Advanced signal-processing algorithms for energy-efficient wireless communications*, Proceedings of the IEEE, vol. 88, No. 10, Oct. 2000, pp. 1633-1650.

Hooli, K., et al., *Performance evaluation of adaptive chip-level channel equalizers in wcdma downlink*.

Hardouin, E., et al., "A Criterion for Adaptive Rake/Equalizer Configuration of Mobile Receivers," IEEE, 2006, pp. 2434-2438.

Jaamour, Y., et al., "Proposed Reconfigurable Solution to Meet SDR Implementation The Equalizer/Rake Case Study," IEEE, 2006, pp. 2607-2612.

JP Office Action, JP Application No. 2010-531499, Mailing Date: Aug. 21, 2012, 4 pages.

\* cited by examiner

PROCESSING SIGNALS IN A WIRELESS COMMUNICATIONS ENVIRONMENT

This application claims priority to GB Application No.: 0721429.9, filed 31 Oct. 2007, the contents of which are incorporated herein by reference in its entirety.

The present invention relates to processing radio signals in a wireless communications system.

The transmission of radio signals carrying data in modern wireless communications can be realised based on a number of different communications systems, often specified by a standard. There are increasing requirements for devices which are able to operate to support more than one of these wireless communications systems. Mobile radio receiver devices include analog radio frequency (RF)/intermediate frequency (IF) stages, which are arranged to receive and transmit wireless signals via one or more antennas. The output of the RF/IF stages is typically converted to baseband, where an analog to digital converter (ADC) converts incoming analog signals to digital samples, which are then processed for signal detection and decoding of the data in the form of reliability values. The ADC may alternatively operate directly at IF, in which case the conversion to baseband is performed in the digital domain. A number of different types of frontend processing of the digital samples are known to implement signal detection, including rake receiver processing and channel equalisation processing.

In Code Division Multiple Access (CDMA) wireless systems, different physical channels are multiplexed in the code domain using separate spreading sequences. In the case of orthogonal spreading codewords, the original data symbols can then be effectively separated at the receiver by despreading.

In a Wideband CDMA (WCDMA) cellular system, downlink code multiplexing is performed using Orthogonal Variable Spreading Factor (OVSF) codes. However, the OVSF codewords are orthogonal to each other only under the condition of perfect time alignment. In the presence of multipath propagation, the code orthogonality is lost, and the operation of despreading is affected by Multiple Access Interference (MAI).

CDMA mobile radio receivers conventionally employ a rake processor which relies on the correlation properties of the spreading sequences. A rake processor is described for example in J. G. Proakis, "Digital Communications", New York: McGraw-Hill, 1995. This type of receiver is subject to performance degradation in the presence of code correlation, if the MAI between code-multiplexed transmission is comparable to the other sources of noise and interference. Under these conditions, a performance advantage may be achieved by attempting to restore the orthogonality between the codes before despreading. Nevertheless, the sub-optimality of conventional 3GPP receivers based on rake processing causes a significant performance penalty, especially for downlink data rates increasing from the 384 kbps for WCDMA Release 99 to high speed downlink packet access (HDSPA) rates of several Mbps. When the code orthogonality is destroyed by multipath, an effective approach is to use channel equalisation instead of rake processing.

Channel equalisation techniques have been widely employed over the last decades for combating intersymbol interference on frequency selective transmission channels. Channel equalisation techniques are described in J. G. Proakis, "Digital Communications", New York: McGraw-Hill, 1995, and S. Benedetto, E. Biglieri, and V. Castellani, "Digital Transmission Theory", Englewood Cliffs, N.J.: Prentice-Hall, 1987. Channel equalisers have recently found application in receivers for Time Division Multiple Access (TDMA) and code division multiple access (CDMA) mobile wireless systems. An example of application of channel equalisation to a CDMA cellular system is described in A. Klein "Data Detection Algorithms Specially Designed for the Downlink of CDMA Mobile Radio Systems", IEEE Vehicular Technology Conference, vol. 1, Phoenix Ariz., May 1997, pp. 203-207. In particular in asynchronous CDMA cellular systems, as in the case of the forward link of the 3GPP WCDMA standard, chip level equalisation allows to significantly improve the performance over conventional rake receivers, at the cost of an increased implementation complexity. This advantage is especially important for high rate data transmission, as in 3GPP high speed downlink packet access (HSDPA).

The output from the rake processing or channel equalisation processing is supplied to subsequent signal processing techniques in order to derive the logical values from the data, in particular decoding functions. The main baseband processing functions following rake/equalizer processing (including descrambling and despreading) are: de-interleaving, rate dematching (dual of the Tx rate matching function that performs repetition or puncturing), channel decoding, and CRC check. Note that this list is not exhaustive, for instance a WCDMA receiver also implements functions like physical channel de-mapping, transport channel de-multiplexing, and others.

In the past, radio receivers implemented either a rake processor or a channel equaliser depending on the communication system for which the receiver was intended. Techniques are known for implementing the rake receiver or the channel equaliser in hardware.

It would be desirable to implement rake receiver and equaliser functions in software. Implementation in software in principle allows the possibility to use a common processor for implementing either a rake receiver or a channel equaliser. More generally, the processor can in principle carry out a number of different operations with the result that managing processing resource would become a significant issue.

In addition, many computer processors are limited, by virtue of having a limited instruction set, fixed at the time of manufacture, in their ability to efficiently handle different types of data processing calculations with certain algorithms and in their ability to perform different algorithms. A processor which provides an improved platform for handling software-customised instructions which operate on multi-bit operand values is described in WO2006/117562 and is available under the trade mark LIVANTO. That processor provides a configurable execution unit comprising operators capable of being dynamically configured at the level of processing multi-bit operand values by an instruction.

According to an aspect of the present invention there is provided a method of processing a signal transmitted over a channel in a wireless communication system, the method comprising: estimating at intervals at least one parameter of a time varying communication environment of said system; monitoring at least one processor-related signal processing criterion for implementing a signal processing activity; selecting, based on said at least one parameter and said at least one processor-related criterion, a signal processing function from a plurality of signal processing functions implementable by a processor; wherein each signal processing function comprises a plurality of code blocks each comprising a sequence of instructions for execution on a processor platform, the processor platform including a set of configurable operators having a plurality of predetermined configurations, each sequence of instructions including at least one configuration instruction which selects one of the plurality of predefined configurations for executing that code block.

This processor platform allows the selection of different processing functions in a wireless environment and the actual switch between functions to be accomplished within a required time.

Another aspect provides a receiver for processing a signal transmitted over a channel in a wireless communications system, the receiver comprising: means for estimating at intervals at least one parameter of a time varying communication environment of said system; means for monitoring at least one processor-related signal processing criterion for implementing a signal processing activity; a processor platform including a set of configurable operators having a plurality of predetermined configurations; storage means holding a plurality of signal processing functions implementable by the processor platform; means for selecting, based on said at least one parameter and said at least one processor-related criterion, a signal processing function from the plurality of signal processing functions; wherein each signal processing function comprises a plurality of code blocks each comprising a sequence of instructions for execution on the processor platform, each sequence of instructions including at least one configuration instruction which selects one of the plurality of predefined configurations for executing that code block.

The signal processing functions can include filtering, channel estimation, rake processing, equalisation, channel decoding; interference cancellation and multiple antenna processing.

The wireless receiver can also perform other functions besides that of signal processing on the received digital samples. Such so-called operational functions include interfacing with peripheral devices, managing a protocol stack, scheduling processor activity and driver management.

The processor-related criterion can be selected from the group comprising current processing load, current power consumption, and current timing deadlines. The current processing load represent the current computational load of the processor (the same as the processing load). Herein, the word "current" refers to the time interval relevant to the selection of processing function.

The sequence of instructions for each code block provides a software implementation which allows any of the signal processing functions to be implemented by the processor in a simple and efficient way. This approach provides an overall reduction of computational complexity, in particular as compared with a receiver which implements either a rake receiver or a channel equaliser in hardware. It also provides a significant advantage as compared with the use of a processor platform which does not support the performance of software-customised instructions which operate on multi-bit operand values.

Conventional modems which are based on a hardware implementation are forced to the choice between a design dictated by maximum data rate requirements and the instantiation of multiple algorithms as separate areas of silicon. This solution implies a higher implementation cost, size and/or power consumption and any compromise inevitably penalises performance. On the other hand, the solution proposed herein allows to reduce complexity, size and cost by reusing a common platform to adaptively select the optimum set of signal processing functions capable of maximising performance and minimising power consumption.

In this context, the word channel is used to denote the transmission channel of the radio signals. The estimated channel parameters generally relate to the propagation channel/cellular environment. The quality of particular channels is affected by environmental, cellular and other conditions in the wireless communications system.

In the processor architecture of WO2006/117562 an instruction fetch and decode circuit decodes data processing instructions and controls the various components of the processor such that configurable information from the instruction is supplied to a programmable lookup table and the or each operands are supplied from a register file to an input interconnect. In this way, the configuration information from the instruction selectively and dynamically modifies aspects of the function and/or behaviour of one or more of configurable operators via the programmable lookup table.

A configurable execution unit including the configurable operator relies on several types of control. First, there is static control exemplified in the hardwiring to provide various operator classes of modules. Second, there is pseudo-static control information (PSCI), which resides, for example, in predetermined configurations of interconnect components and the programmable lookup table. Pseudo-static control information is distributed to certain configurable components to determine aspects of the function and behaviours of the configurable execution unit in advance of performing software-customised instructions which are themselves capable of dynamically configuring (adjusting configuration) of operators on an instruction-by-instruction basis. In addition, there is dynamic control information which can be provided by instructions on a cycle by cycle basis.

For a better understanding of the present invention and to show how the same may be carried into effect, reference will now be made by way of example to the accompanying drawings in which:

FIG. 1 is a schematic block diagram of a wireless communications device;

FIG. 1A which is a highly schematic diagram to illustrate the principles underlying the present invention;

Figure 1:
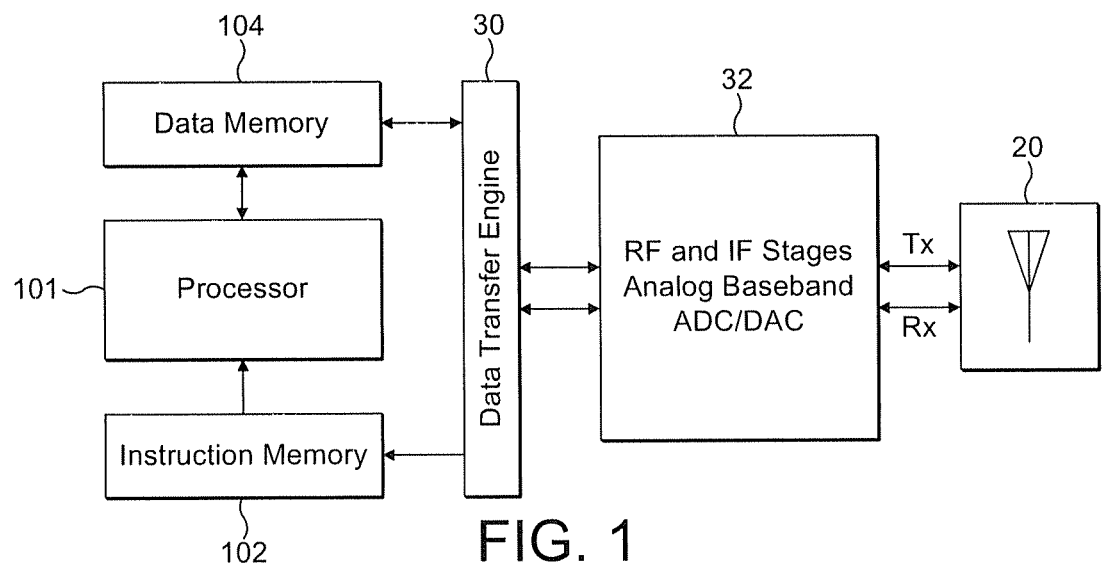

FIG. 1 is a schematic block diagram of a device for transmitting and receiving signals in a wireless communications system. Such a device can be implemented in a number of different ways, but in accordance with FIG. 1 a series of radio RF/IF stages is arranged to receive and transmit wireless signals (TX, RX) via one or more antennas 20. The received signal at the output of the RF/IF stages is typically converted to baseband, where an analog to digital converter (ADC) converts the analog signal into digital samples. The block 32 of FIG. 1 includes components for processing the received radio signals and providing digital samples r(k). This can be achieved in different ways, which are known in the art and which are not discussed further herein.

A processor 100 comprises a processor platform 101, a data memory 104 and an instruction memory 102. Samples r(k) are supplied to a data transfer engine 30 which communicates with the processor platform 101, the instruction memory 102 and the data memory 104. The processor 100 is responsible for processing the samples r(k). The processor platform 101 can execute a number of different functions which are held in the instruction memory 102 in the form of code blocks, each block having a sequence of instructions. This provides a so-called soft modem which has a number of advantages discussed further herein.

Figure 1A:
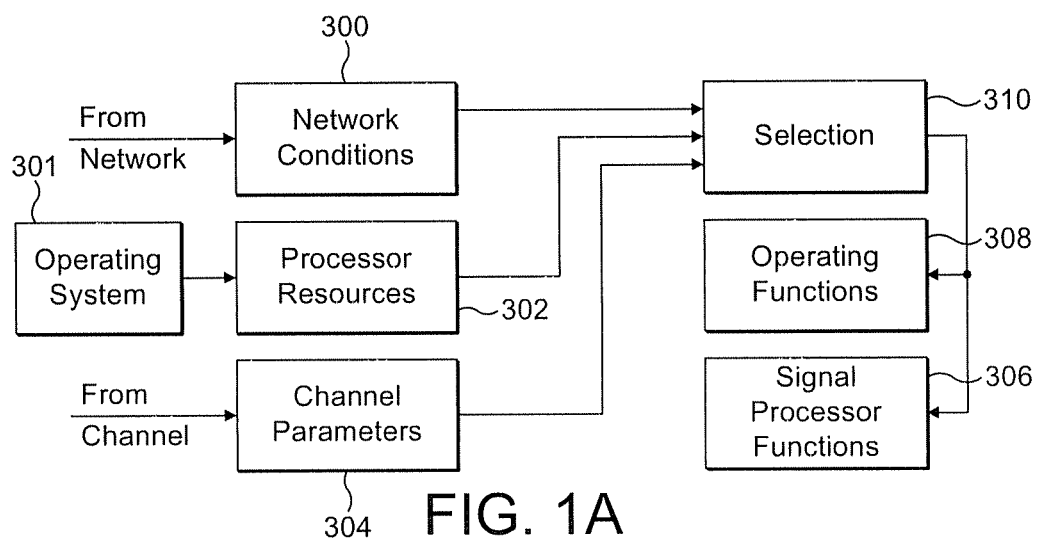

Reference will now be made to FIG. 1A which is a highly schematic diagram to illustrate the principles underlying the present invention. The blocks 300 . . . 310 denote functions stored in the memory 102 and executable by the processing platform 101. These functions fall into different categories, but each function comprises a plurality of code blocks, each block having a sequence of instructions.

Shown on the left hand side are functions which provide information to the processor platform for determining what functions the platform will execute. This includes functions 300 for measuring network conditions, functions 302 for measuring processor resources and functions 304 for estimating channel parameters. The function 300 for measuring network conditions include decoding functions for decoding messages received from a network in which the receiver operates. These messages can provide information about allocation of data rate or block size for message transmission, for example. They generally provide an indication of the state of the network in which the receiver is functioning.

The functions 302 for measuring processor resources measure the current activity of the processor, including the processor's current load, its current power consumption, current deadlines and current processing cycles. The monitoring of processor resources can be achieved by the operating system 301 for the processor platform.

The functions 304 for estimation of channel parameters are concerned with estimating at least one channel parameter which represents the nature of a channel in the wireless environment within which the receiver operates. Specific examples are discussed more fully in the following.

Signal processing functions 306 are used to denote functions which act on digital samples of data received via the wireless network to determine the nature of the data. Specific examples are given in the following, but these include rake receiver processing functions, equalisation functions and decoding functions.

Operation functions 308 include functions to be executed by the processor which are not concerned with signal processing but are concerned with operation of the receiver chip itself. These functions include managing peripheral interfaces, managing drivers, managing a protocol stack and scheduling.

Selection functions 310 (generally implemented in the physical layer) determine the tasks performed by the processor platform 101 at any given time. This allows the processor platform 101 effectively to multitask to carry out all the required operations of the receiver, include both operation functions and signal processing functions. In the architecture discussed in more detail in the following, results are passed from the functions 300, 302 and 304 to the selection function 310 and the selection function 310 can then select from the operation function 308 and the signal processing function 306 appropriate functions dependent on channel conditions, network conditions and availability of processor resource.

The operation functions and signal processing functions can themselves include information about the processor resource required for their execution. This can also be taken into account when making a selection.

Figure 2:
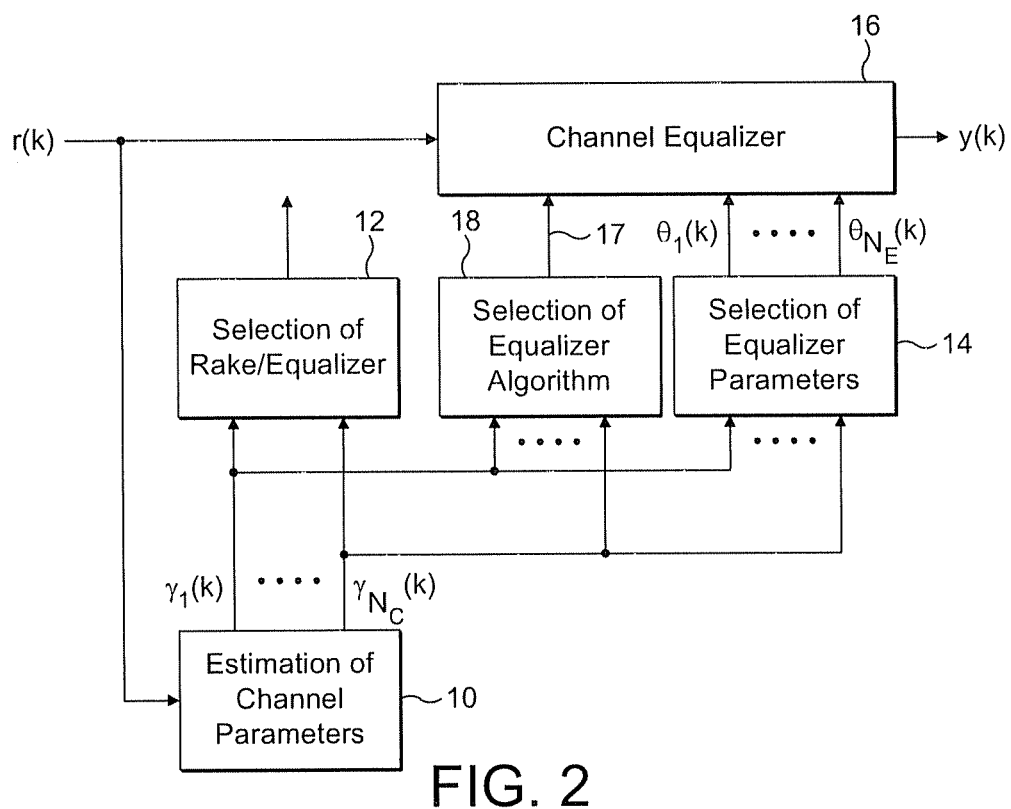
FIG. 2 is a schematic block diagram of processing and selection functions.

FIG. 2 is a schematic block diagram which illustrates one example of processing and selection functions which can be executed by the processor platform 101. A first function denoted by block 10 performs the estimation of channel parameters. This function estimates a number of different parameters relative to the communication channel over which the radio signals are received and transmitted in the wireless communication system. The function 10 provides at time k outputs $\gamma_1(k), \ldots, \gamma_{N_C}(k)$, where $N_C$ denotes the number of estimated channel parameters, that represent a set of channel parameters derived from the received signal samples r(k). The estimated channel parameters $\gamma_n(k)$ can be used for a number of different purposes. As illustrated in FIG. 2, they are supplied to a rake/equaliser selection function 12, which determines whether to process the received samples using a rake receiver or an equaliser receiver. The rake receiver or equaliser receiver is implemented by the processor 100 executing the appropriate code blocks from the instruction memory 102.

The parameters $\gamma_n(k)$ are further supplied to an equaliser algorithm selection function 18, which is used in the event that an equaliser receiver 16 is selected. If used, the equaliser algorithm selection function 18 selects a particular algorithm or implementing the equaliser receiver 16 based on the channel parameters which have been estimated. The algorithm is supplied to the channel equaliser as denoted diagrammatically by input 17. In practice of course this will be implemented by the appropriate algorithm being selected as a code block from the instruction memory 102.

The channel parameters $\gamma_n(k)$ are also supplied to a selection of equaliser parameters selection function 14. The equaliser parameter selection function 14 is used in the event that an equaliser receiver is selected (as denoted by block 16) and controls parameters used for implementing the equaliser receiver, these parameters being denoted $\theta_1(k), \ldots, \gamma_{N_E}(k)$, where $N_E$ denotes the number of relevant equaliser parameters. It will be understood that parameters can be transferred between functions via a register file or memory, discussed later.

Figure 3:
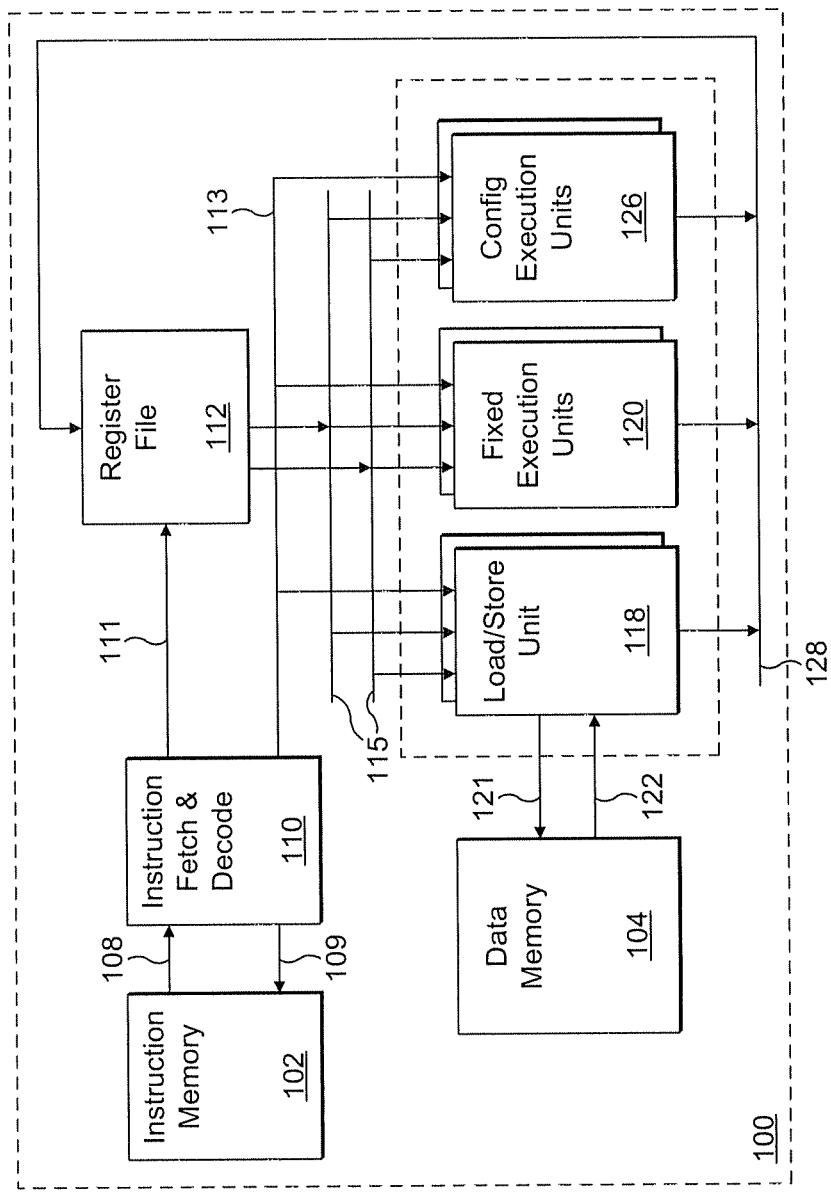
FIG. 3 is a schematic block diagram of a processor architecture.

The architecture of a processor suitably adapted to efficiently handle the various required processing functions and to switch between them will now be described with reference to FIG. 3.

The processor 100 has an instruction memory 102, a data memory 104, an instruction fetch and decode circuit 110, a register file 112, a load/store unit 118, a predetermined number of fixed execution units 120, and a predetermined number of configurable execution units 126.

The instruction memory 102 is coupled to the instruction fetch and decode circuit 110 by means of an instruction bus 108 and an address bus 109. The instruction fetch and decode circuit 110 is further connected to the register file 112 by an address bus 111, and to load/store unit 118, fixed execution units 120 and the configurable execution units 126 by control bus system 113. The control bus 113 is used for example to carry operation configuration information decoded from instructions to the relevant inputs of the load/store unit 118, the fixed execution units 120 and the configurable execution units 126. An operand bus system 115 supplies the load/store unit 118, fixed execution units 120 and the configurable execution units 126 with operands from the register file based on the decoded instruction.

The load/store unit 118 has connections 121, 122 to and from the data memory 104 and can output results to a result bus 128 also serving to receive outputs of the fixed execution units 120 and the configurable execution units 126. The result bus 128 is fed back to an input of the register file 112.

In this embodiment, the processor 100 supports single instruction multiple data (SIMD) processing in the fixed and configurable execution units. In other embodiments it is possible that only one or neither of the fixed and configurable execution units support SIMD processes.

Control circuitry in the instruction fetch and decode circuit 110 is generally responsible for requesting, receiving and decoding a sequence of instructions from the instruction memory 102 and controlling the various components of the processor in accordance with those instructions. Typical instructions include load/store operations, control function operations, data processing operations and/or specific operations performed by various functional units.

Load/store instructions are used to access data in the data memory 104 and to move the data between the data memory 104 and the register file 112, where the data resides immediately prior to, and immediately after, operations performed on it. Control function operations such as branches may operate entirely within the instruction decode and fetch unit 110, for example to affect the sequence of fetched instructions, or may involve one or more of the fixed and configurable execution units in the calculation of settings for the processor. Data processing operations are used in the performance of algorithms and, likewise, may involve fixed and/or configurable execution units, as will be explained in more detail hereinafter.

Figure 4:
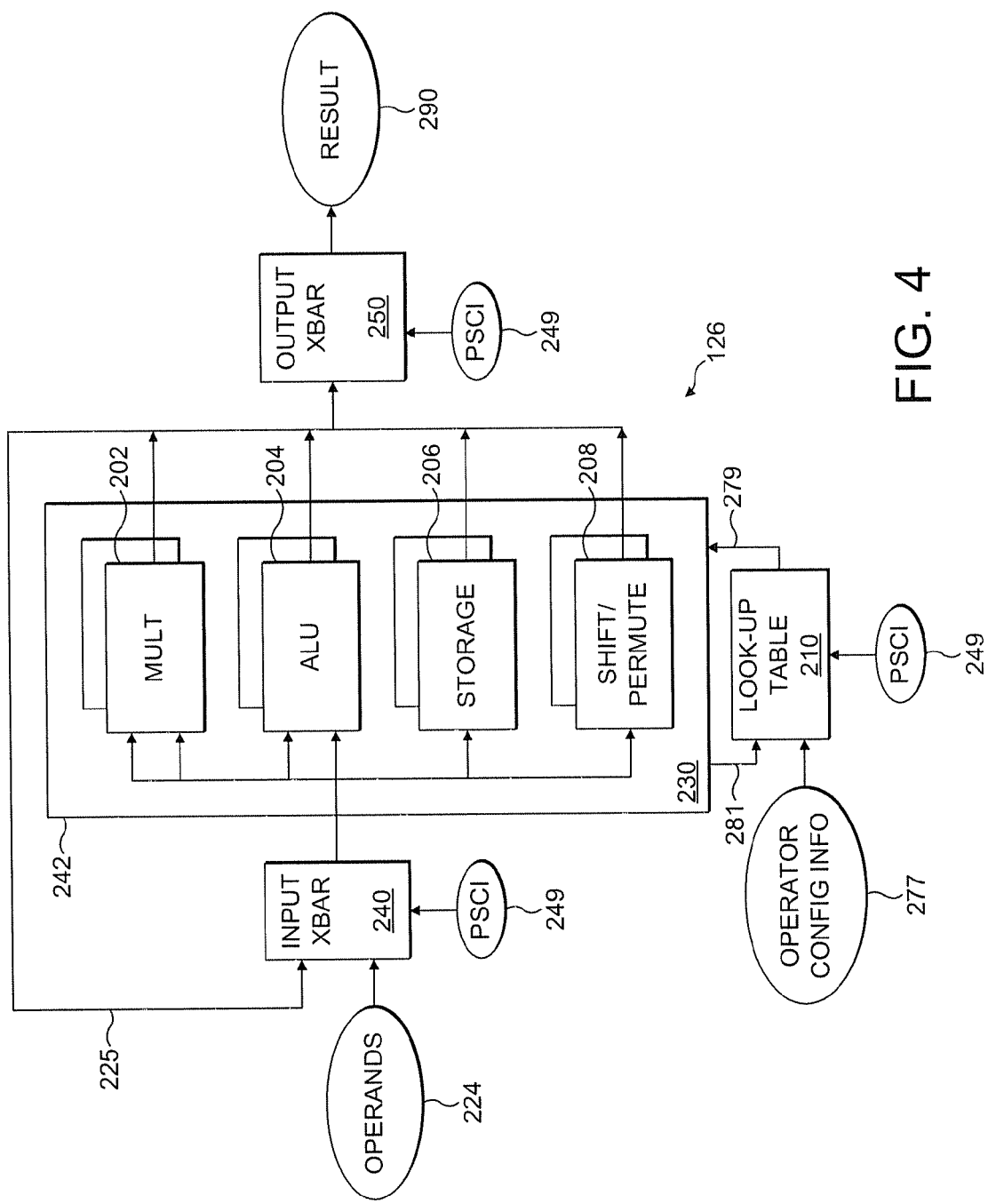
FIG. 4 is a schematic diagram of a configurable execution unit.

FIG. 4 is a schematic illustration of the internal components of an exemplary execution unit 126. With reference to FIG. 4, the configurable execution unit 126 includes a programmable lookup table 210, a configurable operator stage 230, an input crossbar interconnect 240, and an output crossbar interconnect 250.

The programmable lookup table 210 and the interconnects 240, 250 are configurable in the sense they rely on pseudo-static control information which is presetable by special-purpose instructions, but are not themselves dynamically configurable on a cycle-by-cycle basis by data processing instructions. This presetable control information is referred to herein as pseudo-static control information (PSCI) and is indicated by the reference numerals 249 in FIG. 2. The pseudo-static control information 249 dictates aspects of the functionality and behaviour of the programmable lookup table 210 and the crossbar interconnects 240, 250 in a manner that will be apparent to a skilled person.

The configurable operator stage 230 includes sets of operator modules 202-208, each designed to perform a different class of operation. The operator modules are supplied by operand input buses 242 from the input crossbar interconnect. In this exemplary embodiment there are provided multiply operators 202, ALU operators 204, storage operators 206 and shift/permute operators 208. A skilled person will appreciate that the number and functions of operators will be based on the intended application and/or the intended purpose of the processor. It is possible that all or a selection of the operator modules 202-208 are dynamically configurable by means described herein.

The operator modules 202-208 are hard-wired to an extent making them efficient in the operations they are designed to perform but at the same time have various control inputs permitting configurability at the level of behaviour effecting performance of operations on multi-bit values. This is to support variations in behaviour and/or type of the operator modules within the class of operations each is designed to perform. For example an addition unit may support subtraction as well as addition (different types of operation or function within a general class of arithmetic), it may support a variety of SIMD vector data types as well as scalar types (versatile behaviour), and it may support a variety of rounding modes and/or overflow behaviours (selectable behaviour).

In the preferred embodiment, control inputs to the operators 202-208 and interconnections of various elements on the operator stage 230 are configurable to an extent permitting efficient performance of the desired variety of algorithms, particularly vector algorithms, examples of which include convolutions, Fast Fourier Transforms, Trellis/Viterbi calculations, correlations, finite impulse response filtering, and others. These support the processing functions mentioned above, for example rake processing requires mainly correlations for channel estimation and descrambling/despreading; equalization requires different operations, including correlations for channel estimation and computation of the equalizer coefficients, and convolutions for equalizer filtering (FIR filtering in the case of linear equalizer); channel decoding requires trellis calculations for turbo decoding or convolutional (Viterbi) decoding. This extent is in practice readily established by appropriately skilled engineers, who also know the range of data processing functionalities required for an instruction set to support relevant calculations according to such algorithms as well as the control functions of a processor.

The operators of the operator stage 230 are dynamically configurable, on an instruction by instruction basis ("dynamically"), such that an instruction containing configuration information (a configuration instruction—e.g. a data processing instruction) can selectively alter operator function (operation type) and/or behaviour by supplying the configuration information as control settings to be applied when its operands are operated on. Alternatively, the instruction set may be designed so that configuration information in a configuration instruction configures operator function and/or behaviour to be applied when processing operands from a subsequent instruction (e.g. a subsequent data processing operation).

Control inputs 279 for the operators derived from the programmable lookup table 210 are supplied to the operator stage, for example to provide control inputs to control the function and/or behaviour of the operators 204-208. Examples of these control inputs include carry-in signals, multiplexer selections, negotiable inputs, and overflow behaviour control settings. Control outputs 281 from operator modules 202-208 in the operator stage 230 can be output to the programmable lookup table 210, and therefore may, in turn, participate in defining control input settings 279. Examples of control outputs 281 include overflow indicators, FIFO full signals, and the Boolean results of arithmetic comparisons.

In practice, operation configuration information 277 in say a data processing instruction is decoded and supplied to the programmable lookup table 210. This configuration information 277, together with control information 281, is translated by the programmable lookup table 210 into corresponding control inputs 279 for the operator stage and supplied to the operator stage 230. The translation function performed by the lookup table 210 is determined by pseudo-static control information 249, which in turn may be set by earlier control instructions.

In the preferred embodiment, the programmable lookup table 210 may be regarded itself as depending on pseudo-static control information selectable based on operator configuration information in a data processing instruction. The programmable lookup table 210 is thus able to produce inputs to the operators responsive to dynamic configuration information 277 (derived from a configuration instruction), or control outputs from the operators 281, or PSCI 249, or any combination of these inputs to the programmable lookup table 210. There is thus no need for pseudo-static control information to be input directly to the operator stage 230. Although this may be desirable in some circumstances.

Input interconnect 240 provides operand inputs for each of the plurality of operator modules 202-208. The input interconnect 240 can receive operands 224 according to decoded data processing instructions and can receive result values from the outputs of the operators 202-208 via feedback bus 225.

Output interconnect 250 receive outputs from the operator modules 202-208 and supplies the final output result 290 of the configurable execution unit 126. By virtue of the feedback bus 225, the crossbar switch 240 and, optionally also the storage operators 206, series and parallel combinations of simple multiple operations can execute complex operations on the input operands 224 responsive to a single data processing instruction, before supplying a result 290 outside the executable unit. These advantageous types of "deep" execution operation may be regarded, in simple terms, as operations in which a plurality (generally three or more) of mathematical operations are performed sequentially on operands or a set of operands before the results 290 are sent out to be written to a result register in the register file 112. In these types of deep operations the storage operators 206 can hold intermediate results so that they can participate in later operation cycles before results 290 are output.

Figure 5:
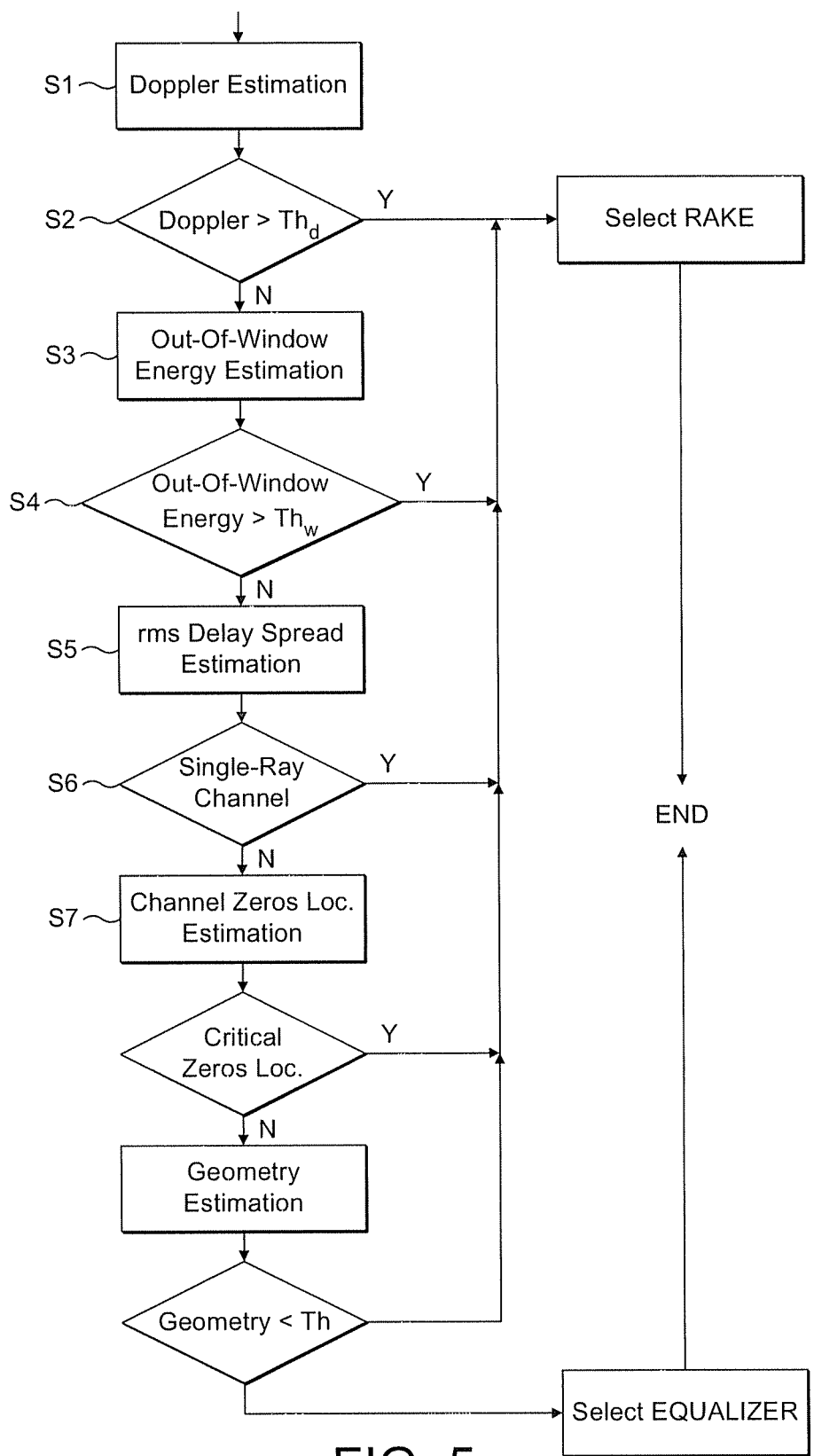
FIG. 5 is a schematic flow diagram of a sequence of steps for selecting a processing function.

Reference will now be made to FIG. 5 to describe a method of selecting a processing function based on the estimation of particular channel parameters. Selection is made by downloading code blocks comprising different sequences of instructions dependent on whether a rake receiver function or equaliser receiver function is to be executed by the processor 22. The inventors have found that it is advantageous to apply the selection criteria by examining different channel parameters in a certain sequence (as illustrated in FIG. 5 and described below). It will readily be appreciated however that other appropriate sequences may also be utilised.

Step S1 produces an estimate of the degree of non-stationarity of the channel, related to mobility of the user of the transmission channel, given for example by an estimate of the Doppler spread or the maximum Doppler frequency or by an estimate of the relative speed of the mobile terminal. These estimators are known in the art and so the manner in which it is estimated is not discussed further herein. Examples are described in G. L. Stuber, "Principles of Mobile Communications", Norwell, Mass.: Kluwer, 1996, A. Sampath and J. M. Holtzman, "Estimation of Maximum Doppler Frequency for Handoff Decisions", in Proceedings of IEEE Vehicular Technology Conference, Secaucus, N.J., May 1993, pp. 859-862, C. Tepedelenlioglu, A. Abdi, G. B. Giannakis, and M. Kaveh, "Estimation of Doppler spread and Signal Strength in Mobile Communications with Applications to Handoff and Adaptive Transmission", Wireless Communications and Mobile Computing, vol. 1, no. 2, pp. 221-242, March 2001, and references therein. The receiver can be designed to use equaliser processing for relatively low time-varying channels, and to switch to rake processing for fast time-varying channels, where the switching threshold should depend on the desired trade-off between equaliser complexity and receiver performance. A Doppler comparison step S2 compares a Doppler estimation signal $\gamma_1$ with a suitable threshold $Th_D$. If $\gamma_1$ exceeds the threshold $Th_D$, the step selects rake receiver processing. If the Doppler estimation signal $\gamma_1$ does not exceed the threshold $Th_D$, the comparison produces a negative answer, and the selection process continues with an out-of-window energy comparison step.

The out-of-window energy estimation S3 provides an estimate of the channel energy outside the time window used for equaliser channel estimation. An example is described in C. Luschi, M. Sandell. P. Strauch, and R.-H. Yan, "Adaptive Channel Memory Truncation for Digital Mobile Communications", in Proceedings of IEEE International Workshop on Intelligent Signal Processing and Communication Systems, Melbourne, Australia, November 1998, pp. 665-669. Equaliser processing is selected only when a significant percentage of the channel energy is captured by the channel estimation window—which will not happen in the case of very high delay spread. To this end, the out-of-window energy $\gamma_2$ is compared with a threshold $Th_W$. If $\gamma_2$ is greater than the threshold $Th_W$, the step selects rake receiver processing. If the out-of-window energy $\gamma_2$ is not greater than $Th_W$, to the selection process continues with a single-ray channel detection step.

A delay spread estimation S5 generates an output $\gamma_3$, given for example by an estimate of the root mean square (rms) delay spread. An example of delay spread estimation is given in H. Arslan and T. Yucek, "Delay Spread Estimation for Wireless Communication System", in Proceedings of IEEE International Symposium on Computers and Communication, Kemer-Antalya, Turkey, June-July 2003, pp. 282-287. The parameter $\gamma_3$ is supplied to the single-ray channel detection step S6 to determine if the transmission channel can be considered to result from a single propagation path (multipath absent). In case of single-path propagation, the step selects rake receiver processing.

More generally identification of the conditions of very high delay spread (long channel impulse response) and zero delay spread (single ray channel impulse response) can be used to switch the receiver to rake receiver processing. The term "channel length" is often used in the art to denote the temporal duration of the channel impulse response, which is related to the channel delay spread.

In the event of non single-ray channel, the process passes to an estimate of channel characteristics from the location of the channel zeros in the z-plane (S7). Examples of how this is done are given in Y. Bistritz, "Zero Location with Respect to the Unit Circle of Discrete-Time Linear System Polynomials", Proceedings of the IEEE, vol. 72, no. 9, pp. 1131-1142, September 1984, and references therein, The receiver may be designed to switch to rake processing in the presence of locations of the zeros that identify channel characteristics that are critical for the operation of the equaliser—as in the case of linear equalisation with channel zeros close to the unit circle of the z-plane, or for fractionally-spaced equalisation or, more generally receive diversity equalisation (multiple receive antennas or multiple subchannels obtained by oversampling) with common zeros among the equaliser subchannels. The estimate of the channel zeros location $\gamma_4$ is supplied to a critical zeros location detector step S8, which selects rake receiver processing in the presence of the locations of zeros which would be critical for operation of an equaliser. In case of non-critical channel characteristics, the selection process continues with a cell geometry comparison step.

A cell geometry estimation block provides an estimate $\gamma_5$ of the ratio between received intracell power and noise-plus-intercell interference power (or its inverse), or an estimate of the ratio between total received power and noise-plus-intercell interference power (or its inverse). An example of a cell geometry estimation technique that can be used is described in our copending application [PWF Ref. 316036 GB]. Alternatively, any known technique for estimating signal to disturbance ratios on an incoming radio signal can be used, where disturbance is interference or noise or both. An example of signal to disturbance ratio estimation for a wireless cellular system is given in M. Turkboylari and G. L. Stuber, "An Efficient Algorithm for Estimating the Signal-to-Interference Ratio in TDMA Cellular Systems", IEEE Transactions on Communications, vol. 46, no. 6, pp. 728-731, June 1998. As a further alternative, an estimate of the signal to disturbance ratio $\gamma_6$ of the estimated channel response can be used, or any other indication of the quality of the available channel estimate.

In addition to switching between the rake and equaliser, in the case that the equaliser 16 has been selected the channel parameters estimated by the channel parameter estimation function 10 can be used to select the parameters $\theta_n$, n= 1, . . . , $N_E$ for the implementation of the equaliser 16.

Figure 6:
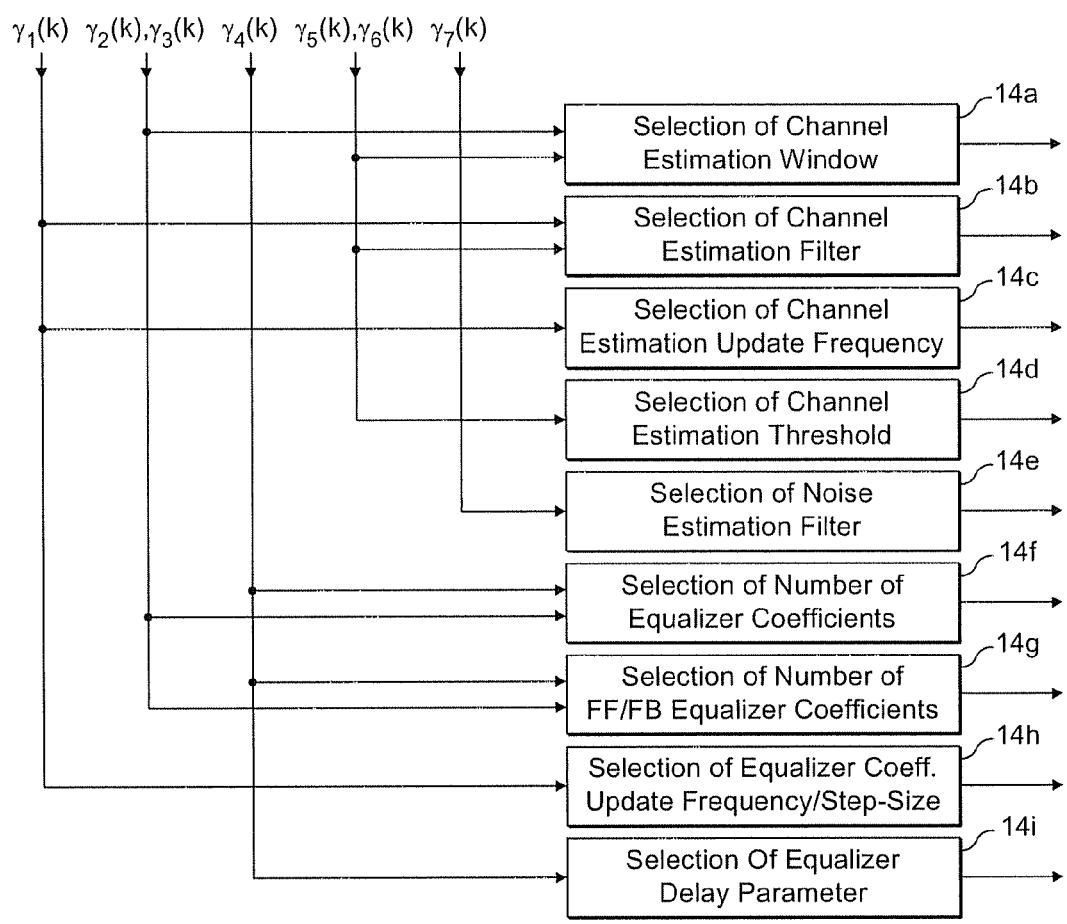
FIG. 6 is a schematic block diagram of selection of equaliser parameters.

FIG. 6 is a schematic block diagram for the selection of a set of equaliser parameters within the equaliser parameter selection function 14.

The time window W for estimation of the channel impulse response in the equaliser can be selected on the basis of estimates of the channel out-of-window energy $\gamma_2$ and/or of the channel delay spread $\gamma_3$ (block 14a of FIG. 5). This selection may also depend on an estimate $\gamma_5$ of the input signal-to-disturbance ratio or the cell geometry, and/or on an estimate $\gamma_6$ of the signal-to-disturbance ratio of the estimated channel coefficients.

The memory of an appropriate filter for estimation of the channel impulse response (block 14b of FIG. 5) and the frequency of update of the estimated channel impulse response (block 14c of FIG. 5) can be selected on the basis of an estimate of the degree of channel non-stationarity or temporal selectivity, for example through an estimate of the channel Doppler spread $\gamma_1$. The selection of the channel estimation filter could also be based on an estimate $\gamma_5$ of the input signal-to-disturbance ratio or the cell geometry, and/or on an estimate $\gamma_6$ of the signal-to-disturbance ratio of the estimated channel response.

At intermediate to low signal to noise-plus-interference ratios, the total channel estimation error can be reduced by setting to zero the estimated channel coefficients with amplitude lower than a suitable threshold. The value of this threshold can be selected based on an estimate $\gamma_5$ of the input signal-to-disturbance ratio or the cell geometry, and/or on an estimate $\gamma_6$ of the signal-to-disturbance ratio for the estimated channel coefficients (block 14d of FIG. 5).

The memory of appropriate filters for estimation of the input noise variance $\sigma^2$, for example in the case of MMSE equalisation, can be made adaptive in the presence on non-stationary input noise by measuring the degree of non-stationarity of the input disturbance $\gamma_7$ (for instance, the time interval over which the noise is approximately constant) (block 14e of FIG. 5). On a completely different basis, the filtering may depend on the periodicity with which it is convenient to collect observations on the input noise—this in turn may be motivated simply by the need to reduce the implementation complexity in specific operating conditions or under critical processing requirements.

The number of equaliser coefficients (i.e., the equaliser time span) can be selected for example on the basis of estimates of the channel out-of-window energy $\gamma_2$ and/or of the channel length or the channel delay spread $\gamma_3$ and on an estimate of the position of the channel zeros in the z-plane $\gamma_4$ (block 14f of FIG. 5).

The number of feedforward and feedback equaliser coefficients in the case of decision feedback equalisation can similarly be based on estimates of the channel out-of-window energy $\gamma_2$ and/or of the channel length (or the channel delay spread) $\gamma_3$ and the position of the channel zeros in the z-plane $\gamma_4$ (block 14g of FIG. 5).

The frequency of update of the equaliser coefficients in the case of block equalisation, or the coefficient step size in the case of adaptive equalisation, can be selected on the basis of an estimate of the degree of channel non-stationarity or temporal selectivity, e.g. through an estimate of a channel Doppler spread $\gamma_1$ (block 14h of FIG. 5).

The equaliser delay can be selected on the basis of an estimate of the channel phase characteristics derived from location of the channel zeros in the z-plane $\gamma_4$ (block 14i of FIG. 5).

Figure 7:
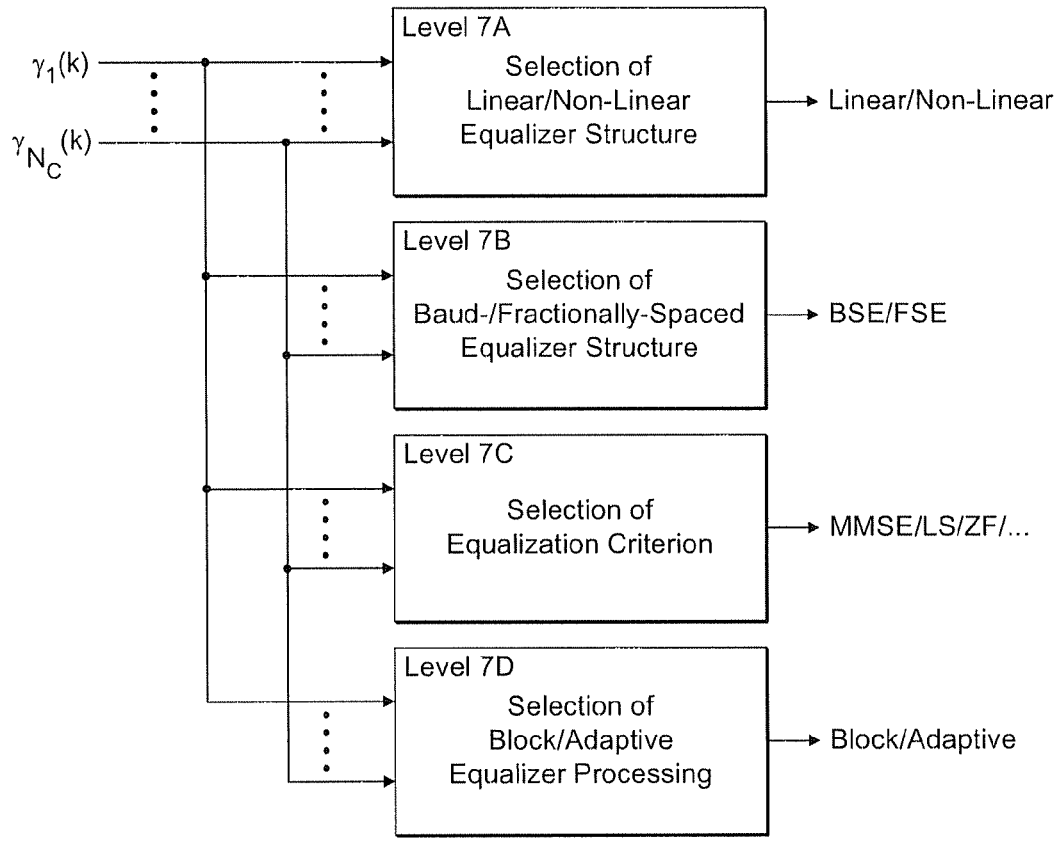
FIG. 7 is a schematic block diagram of selection of equaliser algorithms.

Reference will now be made to FIG. 7 which is a schematic block diagram illustrating the selection of a particular equalisation algorithm based on the estimated channel conditions. While the sequence described below represents one useful embodiment of the invention, it will be appreciated that any other sequence can be utilised to implement selection of the appropriate equaliser algorithm.

Level 7a in FIG. 7 denotes the selection of a linear or non-linear equaliser structure. Linear equalisation based on a transversal filter structure has been employed since the early work of Lucky (R. W. Lucky, "Automatic Equalization for Digital Communication", Bell System Technical Journal, vol. 44, pp. 547-588, April 1965), Proakis and Miller (J. G. Proakis and J. H. Miller, "An Adaptive receiver for Digital Signaling Through Channels with Intersymbol Interference", IEEE Transactions on Information Theory, vol. 15, no. 4, pp. 484-497, July 1969) and others (see S. U. H. Qureshi "Adaptive Equalization", Proceedings of the IEEE, vol. 73, no. 9, pp. 1349-1387, September 1985 and references therein). Non-linear equalisers include decision-feedback equalisers (described for example in J. Salz, "Optimum Mean Square Decision Feedback Equalization", Bell System Technical Journal, vol. 52, pp. 1341-1373, October 1073, and C. A. Belfiore and J. H. Park, Jr., "Decision Feedback Equalization", Proceedings of the IEEE, vol. 67, no. 8, pp. 1143-1156, August 1979) and maximum-likelihood (ML) or maximum a posteriori probability (MAP) trellis equalisers (described for example in G. D. Forney, Jr., "Maximum Likelihood Sequence Estimation of Digital Sequences in the Presence of Intersymbol Interference", IEEE Transactions on Information Theory, vol. 18, no. 3, pp. 363-378, May 1972, and L. R. Bahl, J. Cocke, F. Jelinek, and Raviv, "Optimal Decoding of Linear Codes for Minimizing Symbol Error Rate", IEEE Transactions on Information Theory, vol. 20, pp. 284-287, March 1974). Linear and non-linear equalisers are also discussed in S. Benedetto, E. Biglieri, and V. Castellani, "Digital Transmission Theory", Englewood Cliffs, N.J., Prentice-Hall, 1987 and D. P. Taylor, G. M. Vitetta, B. D. Hart, and A. Mammela, "Wireless Channel Equalization", European Transactions on Telecommunications, vol. 9, no. 2, pp. 117-143, March 1998. A criterion for making the choice between a linear or non-linear equaliser can be based for example on the location of channel zeros in the z-plane $\gamma_4$. In addition, this selection could depend on specific transmission conditions. For instance, in an HSDPA system, the use of a decision feedback equaliser (that is, having a non-linear structure) may be limited to a condition where the user is allocated a significant percentage of the downlink power—which determines the portion of the downlink signal that can be used for decision feedback without requiring to make decisions on other user's data.

Level 7b in FIG. 7 denotes the selection of Baud-spaced or fractionally-spaced equaliser structure. Baud-spaced (symbol- or chip-spaced) and fractionally spaced equalisers are described for example in S. U. H. Qureshi "Adaptive Equalization", Proceedings of the IEEE, vol. 73, no. 9, pp. 1349-1387, September 1985 and J. R. Treichler, I. Fijalkow, and C. R. Johnson, Jr., "Fractionally Spaced Equalizers", IEEE Signal Processing Magazine, vol. 13, no. 3, pp. 65-81, May 1996. This selection is made based for instance on the location of the channel zeros in the z-plane $\gamma_4$, and could optionally take into account the amount of excess transmission bandwidth (roll-off factor of transmit and receive filters).

It will be clear that either Baud-spaced or fractionally spaced design can be used with either of the linear or non-linear structures.

Level 7c in FIG. 7 denotes the selection of the equaliser cost function, specifically between the options of Minimum Mean-Square Error (MMSE) criterion, Least-Squares (LS) criterion, Zero-Forcing (ZF) criterion, or a criterion based on a different cost, including the maximum-likelihood (ML) criterion and the maximum a posteriori probability (MAP) criterion. MMSE, LS, ZF and ML equalizers are described in S. U. H. Qureshi "Adaptive Equalization", Proceedings of the IEEE, vol. 73, no. 9, pp. 1349-1387, September 1985 and S. Benedetto, E. Biglieri, and V. Castellani, "Digital Transmission Theory", Englewood Cliffs, N.J., Prentice-Hall, 1987, while MAP equalisers are discussed in D. P. Taylor, G. M. Vitetta, B. D. Hart, and A. Mämmelä, "Wireless Channel Equalization", European Transactions on Telecommunications, vol. 9, no. 2, pp. 117-143, March 1998 and C. Luschi et al., "Advanced Signal Processing Algorithms for Energy-Efficient Wireless Communications", Proceedings of the IEEE vol. 88, no. 10, pp. 1633-1650, October 2000. Parameters that can be used to select between these criteria include an estimate of the signal-to-disturbance ratio or other parameters indicative of the statistical distribution of the disturbance. For instance, acceptable performance can be obtained for high signal-to-disturbance ratios using the ZF criterion. On the other hand, the use of a LS equaliser is preferable with respect to a MMSE equaliser in the presence of non-Gaussian disturbance.

Level 7d in FIG. 7 denotes the choice between equaliser block processing or the implementation of a tap adaptation rule. The selection between these two strategies may be made dependent on the degree of channel non-stationarity or temporal selectivity, e.g. through an estimate of a channel Doppler spread $\gamma_1$.

Block processing is mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. An adaptive algorithm is mentioned in K. Hooli, M. Latva-aho and M. Juntti, "Performance Evaluation of Adaptive Chip-Level Channel Equalizers in WCDMA Downlink", in Proceedings of IEEE International Conference on Communications, vol. 6, Helsinki, Finland, June 2001, pp. 1974-1979.

Figure 8:
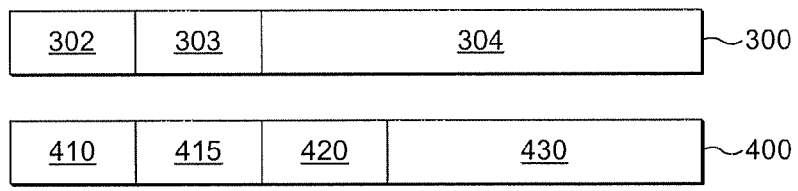
FIG. 8 shows instruction formats.

Various instruction formats suitable for use with embodiments of the present invention are shown in FIG. 8. At 300 there is a PSCI setting instruction specifically designed to perform pseudo static control setting operations for example for one or more fo the components 210, 240 and/or 250. The PSCI setting instruction 300 includes a first opcode portion 302 indicating it is a type of PSCI setting instruction, and a second opcode portion 303 indicating a destination associated with the or each component 210, 240, 250 intended to be configured. The remainder of the instruction 304 may be used to carry or point to PSCI intended for the destination.

Referring to the instruction format 400 there is disclosed a class of data processing instructions including dynamic configuration setting information, based on which a reference is made in the programmable look-up table 210. The instruction 400 includes a first opcode portion 410 defining the data processing operation to be performed, preferably including an indication that the instruction is a type of data processing operation including dynamic configuration setting information for configuring one or more operators of the configurable execution unit 230. The instruction 400 also includes a second opcode portion 415 pointing to a destination address to which the results will be sent, a third opcode portion 420 containing operator configuration information 420, and one or more operands 430 for use in the data processing operation. Alternatively, the field 430 may include pointers to one or more operands in registers. A skilled person will appreciate that one or more of the fields described may be combined or omitted in other embodiments.

The operator configuration information 420 is used to access the look-up table 210 and is translated to contribute to operator control input settings 279, as described hereinbefore.

The invention claimed is:

1. A method of processing a signal transmitted over a channel in a wireless communication system, the method comprising:
   receiving at a receiver said signal transmitted over said channel;
   estimating at intervals at least one parameter of a time varying communication environment of said system;
   monitoring at least one processor-related criterion of a processor at the receiver;
   selecting a signal processing function from a plurality of signal processing functions implementable by the processor, wherein said selecting of said signal processing function is based on both said at least one parameter and said at least one processor-related criterion;
   wherein:
      each signal processing function comprises a plurality of code blocks which process said received signal, each comprising a sequence of instructions for execution on a processor platform of the processor, the processor platform including a set of configurable operators having a plurality of predetermined configurations, each sequence of instructions including at least one configuration instruction which selects one of the plurality of predefined configurations for executing that code block, wherein the processor platform is configured according to the selected one of the plurality of predefined configurations to execute that code block for the selected signal processing function; and
      the parameter is a channel parameter indicative of channel conditions of said channel, the channel parameter selected from:
         (a) estimating a channel parameter indicative of the degree of non-stationarity of the channel, and comparing that estimate with at least one mobility threshold;
         (b) estimating a channel parameter indicative of the energy of the channel outside a predefined temporal window, and comparing that estimate with at least one out-of-window energy threshold;
         (c) estimating a channel parameter indicative of at least one of the temporal duration of the channel response or channel length and channel delay distribution, and establishing if the estimated temporal duration or channel length or delay distribution meets predetermined criteria;
         (d) estimating a channel parameter indicating the location of the channel zeros in the z-plane, and establishing if the location of the channel zeros meets predetermined criteria;
         (e) estimating a channel parameter indicative of a signal-to-disturbance power ratio of the received signal; and comparing the estimated input signalto-disturbance ratio with at least one signal-to-disturbance ratio threshold; and (f) estimating a channel parameter indicative of the signal-to-disturbance power ratio of the estimated channel response;

(g) estimating a channel parameter indicative of the degree of non-stationarity of the disturbance at the receiver input.

2. A method according to claim 1, wherein the parameter is a network parameter indicative of network conditions in a wireless network.

3. A method according to claim 1, wherein the processor-related criterion is reported from the processor platform.

4. A method according to claim 1, wherein each signal processing function is associated with a processing resource requirement, and said step of selecting takes into account the resource requirement when selecting a signal processing function.

5. A method according to claim 1, wherein the network parameter is derived from an incoming message transmitted from a network source.

6. A method according to claim 1 or 5, wherein the network parameter is selected from:
allocation of data rate for transmitting a message;
allocation of block size for transmitting a message; and
specification of quality target to transmit a message, the quality target optionally represented by a block-error rate or bit-error rate; and
indication of the level of intra-cell or inter-cell interference in the network.

7. A method according to claim 1, wherein the processor platform executes operational functions, each having a plurality of code blocks comprising a sequence of instructions.

8. A method according to claim 1, wherein the signal processing functions include filtering, channel estimation, rake processing, equalisation, interference cancellation, multiple antenna processing and channel decoding.

9. A method according to claim 7, wherein the operational functions include peripheral interfacing, protocol stack processing, scheduling and driver management.

10. A method according to claim 1, wherein the processor-related criterion is selected from the group comprising current processing load, current power consumption, and current timing deadlines.

11. A method according to claim 1 or 10, wherein a plurality of processor-related criteria are monitored.

12. A receiver for processing a signal transmitted over a channel in a wireless communications system, the receiver comprising:
means for receiving said signal transmitted over said channel;
means for estimating at intervals at least one parameter of a time varying communication environment of said system;
a processor;
means for monitoring at least one processor-related criterion of the processor;
the processor having a processor platform including a set of configurable operators having a plurality of predetermined configurations;
storage means holding a plurality of signal processing functions implementable by the processor platform;
means for selecting, based on both said at least one parameter and said at least one processor-related criterion, a signal processing function from the plurality of signal processing functions;
wherein;
each signal processing function comprises a plurality of code blocks which process said received signal, each comprising a sequence of instructions for execution on the processor platform, each sequence of instructions including at least one configuration instruction which selects one of the plurality of predefined configurations for executing that code block, wherein the processor platform is configured according to the selected one of the plurality of predefined configurations to execute that code block for the selected signal processing function; and
the parameter is a channel parameter indicative of channel conditions of said channel, the channel parameter selected from:
(a) estimating a channel parameter indicative of the degree of non-stationarity of the channel, and comparing that estimate with at least one mobility threshold;
(b) estimating a channel parameter indicative of the energy of the channel outside a predefined temporal window, and comparing that estimate with at least one out-of-window energy threshold;
(c) estimating a channel parameter indicative of at least one of the temporal duration of the channel response or channel length and channel delay distribution, and establishing if the estimated temoral duration or channel length or delay distribution meets predetermined criteria;
(d) estimating a channel parameter indicating the location of the channel zeros in the z-plane, and establishing if the location of the channel zeros meets predetermined criteria;
(e) estimating a channel parameter indicative of a signal-to-disturbance power ratio of the received signal; and comparing the estimated input signal-to-disturbance ratio with at least one signal-to-disturbance ratio threshold; and
(f) estimating a channel parameter indicative of the signal-to-disturbance power ratio of the estimated channel response;
(g) estimating a channel parameter indicative of the degree of non-stationarity of the disturbance at the receiver input.

13. A receiver according to claim 12, wherein said estimating means and monitoring means are implemented by code sequences executable by the processor platform.

* * * * *